(12) United States Patent
Shen

(10) Patent No.: US 10,147,254 B1
(45) Date of Patent: Dec. 4, 2018

(54) METHOD FOR WIRELESSLY CHARGING AND UNLOCKING AN ELECTRIC LOCK

(71) Applicant: I-Ting Shen, Tainan (TW)

(72) Inventor: I-Ting Shen, Tainan (TW)

( * ) Notice: Subject to any disclaimer, the term of this patent is extended or adjusted under 35 U.S.C. 154(b) by 0 days.

(21) Appl. No.: 15/682,635

(22) Filed: Aug. 22, 2017

(30) Foreign Application Priority Data

Jul. 20, 2017 (TW) .............................. 106124327 A

(51) Int. Cl.
| | | |
|---|---|---|
| *G06K 19/077* | (2006.01) | |
| *G07C 9/00* | (2006.01) | |
| *E05B 47/00* | (2006.01) | |
| *H04W 4/80* | (2018.01) | |

(52) U.S. Cl.
CPC ...... *G07C 9/00309* (2013.01); *E05B 47/0001* (2013.01); *G07C 9/00111* (2013.01); *G07C 9/00896* (2013.01); *H04W 4/80* (2018.02)

(58) Field of Classification Search
None
See application file for complete search history.

(56) References Cited

U.S. PATENT DOCUMENTS

| | | | | |
|---|---|---|---|---|
| 7,912,503 B2* | 3/2011 | Chang | ............... | H04M 1/72527 455/552.1 |
| 9,222,282 B2* | 12/2015 | Russo | ................ | G07C 9/00309 |
| 9,607,459 B2* | 3/2017 | Chang | ................ | G07C 9/00174 |
| 9,876,386 B2* | 1/2018 | Geiszler | ................. | H02J 7/025 |

\* cited by examiner

*Primary Examiner* — K. Wong
(74) *Attorney, Agent, or Firm* — Alan D. Kamrath; Kamrath IP Lawfirm, P.A.

(57) ABSTRACT

A method for wirelessly charging and unlocking an electric lock includes automatically connecting a portable unlocking device with an electric lock when a distance therebetween is smaller than an activation range. The electric lock compares a first identification information in the portable unlocking device with a first authorized identification information in the electric lock. If not matched, the electric lock is disconnected from the portable unlocking device. If matched, the electric lock transmits a charging request signal to the portable unlocking device to charge a battery in the electric lock. Next, the electric lock outputs an awakening signal to the portable unlocking device to awaken a lock control program in the portable unlocking device. Then, a user of the portable unlocking device instantly inputs a second identification information for comparison with second authorized identification information in the electric lock. If matched, the electric lock is unlocked.

5 Claims, 3 Drawing Sheets

METHOD FOR WIRELESSLY CHARGING AND UNLOCKING AN ELECTRIC LOCK

BACKGROUND OF THE INVENTION

The present invention relates to a method for wirelessly charging and unlocking an electric lock and, more particularly, to a method for wirelessly charging and unlocking an electric lock to provide a better anti-burglar effect within a shorter period of time.

Locks are mounted in various places, such as doors, vehicles, etc., to provide an anti-burglar effect. With the development of technologies, electric locks including a mechanical mechanism, an electronic mechanism, and an electric mechanism have been developed. An electric lock requires electricity to operate the electronic mechanism and the electric mechanism to thereby lock or unlock the mechanical mechanism.

However, when the residual electricity of the battery of an electric lock is insufficient to support normal operation, unlocking or locking could not be achieved. Thus, a disadvantage of an electric lock, particularly an electric door lock mounted on a door, has insufficient electricity after long-term use. Most of the doors of houses still use mechanical locks. When it is desired to replace a mechanical lock on a door with an electric lock, it is difficult for an average user or a locksmith to directly connect the electric lock to an indoor power source. Thus, the electric lock on a door is generally powered by the electricity of a battery which cannot be charged during use. As a result, the battery is out of electricity after long-term use.

Furthermore, an electric lock is generally unlocked by a door access card (using a radio frequency identification technology) or an electronic key. During the unlocking procedure, the electric lock reads a password or identification information stored in the door access card or the electronic key. The electric lock is unlocked if the password or identification information matches with authorized identification information stored in the electric lock. On the other hand, the electric lock remains in the locked state if the password or identification information does not match with the authorized identification information stored in the electric lock. However, in a case that the door access card or the electronic key is lost, a person picking up the door access card or the electronic key can use it to unlock the electric lock, leading to risks of theft.

In an electric lock system using a smart phone to unlock, the smart phone includes an unlocking program that is executed to transmit an unlocking signal to the electric lock for the unlocking operation. If the smart phone is lost, the person picking up the smart phone cannot unlock the electric lock. However, the owner of the smart phone has to execute the unlocking program himself or herself, including opening the screen of the smart phone and touching an icon (representing the unlocking program) on the screen to execute the unlocking program to thereby connect the smart phone with the electric lock. Then, the unlocking program sends the unlocking signal to unlock the electric lock. The time required for the whole unlocking procedure is longer than the conventional unlocking procedure using a door access card or a mechanical lock, failing to provide use convenience.

Thus, a need exists for a novel method for wirelessly charging and unlocking an electric lock to provide a better anti-burglar effect within a shorter period of time.

BRIEF SUMMARY OF THE INVENTION

In a first aspect, a method for wirelessly charging and unlocking an electric lock according to the present invention includes:

automatically connecting a portable unlocking device with an electric lock when a distance between the portable unlocking device and the electric lock is smaller than an activation range;

automatically reading, by the electric lock, a first identification information stored in the portable unlocking device connected to the electric lock;

comparing, by the electric lock, the first identification information with a first authorized identification information stored in the electric lock;

disconnecting the electric lock from the portable unlocking device when the first identification information does not match with the first authorized identification information;

maintaining the connection between the electric lock and the portable unlocking device when the first identification information matches with the first authorized identification information;

transmitting a charging request signal, by the electric lock to the portable unlocking device when the connection between the electric lock and the portable unlocking device is maintained, and transmitting, by the portable unlocking device, a charging signal to proceed with charging of a first battery that provides electricity required for operation of the electric lock;

outputting an awakening signal, by the electric lock, to the portable unlocking device to awaken a lock control program in the portable unlocking device when the connection between the electric lock and the portable unlocking device is maintained;

instantly inputting a second identification information, by a user of the portable unlocking device after the lock control program has been awakened, and sending the second identification information to the electric lock;

comparing the second identification information, by the electric lock, with second authorized identification information stored in the electric lock;

maintaining the electric lock in a locked state when the second identification information does not match with the second authorized identification information; and unlocking the electric lock when the second identification information matches with the second authorized identification information.

In a second aspect, a method for wirelessly charging and unlocking an electric lock according to the present invention includes:

automatically connecting a portable unlocking device with an electric lock when a distance between the portable unlocking device and the electric lock is smaller than an activation range;

automatically reading, by the electric lock, a first identification information stored in the portable unlocking device connected to the electric lock;

comparing, by the electric lock, the first identification information with a first authorized identification information stored in the electric lock;

disconnecting the electric lock from the portable unlocking device when the first identification information does not match with the first authorized identification information;

maintaining the connection between the electric lock and the portable unlocking device when the first identification information matches with the first authorized identification information;

detecting, by the electric lock, a residual electricity of a first battery that provides electricity required for operation of the electric lock;

transmitting a charging request signal, by the electric lock, to the portable unlocking device when the residual electricity is smaller than a predetermined value, and transmitting, by the portable unlocking device, a charging signal to proceed with charging of the first battery;

not outputting the charging request signal to the portable unlocking device when the residual electricity is greater than the predetermined value, and not transmitting the charging signal to the electronic device;

outputting an awakening signal, by the electric lock, to the portable unlocking device to awaken a lock control program in the portable unlocking device when the connection between the electric lock and the portable unlocking device is maintained;

instantly inputting a second identification information, by a user of the portable unlocking device after the lock control program has been awakened, and sending the second identification information to the electric lock;

comparing the second identification information, by the electric lock, with second authorized identification information stored in the electric lock;

maintaining the electric lock in a locked state when the second identification information does not match with the second authorized identification information; and unlocking the electric lock when the second identification information matches with the second authorized identification information.

In a third aspect, a method for wirelessly charging and unlocking an electric lock according to the present invention includes:

automatically connecting a smart phone with an electric lock when a distance between the smart phone and the electric lock is smaller than an activation range;

automatically reading, by the electric lock, a first identification information stored in the smart phone connected to the electric lock;

comparing, by the electric lock, the first identification information with a first authorized identification information stored in the electric lock;

disconnecting the electric lock from the smart phone when the first identification information does not match with the first authorized identification information;

maintaining the connection between the electric lock and the smart phone when the first identification information matches with the first authorized identification information;

outputting an awakening signal, by the electric lock, to the smart phone to awaken a lock control program in the smart phone when the connection between the electric lock and the smart phone is maintained;

instantly inputting a second identification information, by a user of the smart phone after the lock control program has been awakened, and sending the second identification information to the electric lock;

comparing the second identification information, by the electric lock, with second authorized identification information stored in the electric lock;

maintaining the electric lock in a locked state when the second identification information does not match with the second authorized identification information; and unlocking the electric lock when the second identification information matches with the second authorized identification information.

The method can further include locking the unlocked electric lock when the distance between the portable unlocking device and the electronic device is larger than the activation range.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

All figures are drawn for ease of explanation of the basic teachings only; the extensions of the figures with respect to number, position, relationship, and dimensions of the parts to form the illustrative embodiments will be explained or will be within the skill of the art after the following teachings have been read and understood. Further, the exact dimensions and dimensional proportions to conform to specific force, weight, strength, and similar requirements will likewise be within the skill of the art after the following teachings have been read and understood.

DETAILED DESCRIPTION OF THE INVENTION

Figure 1:
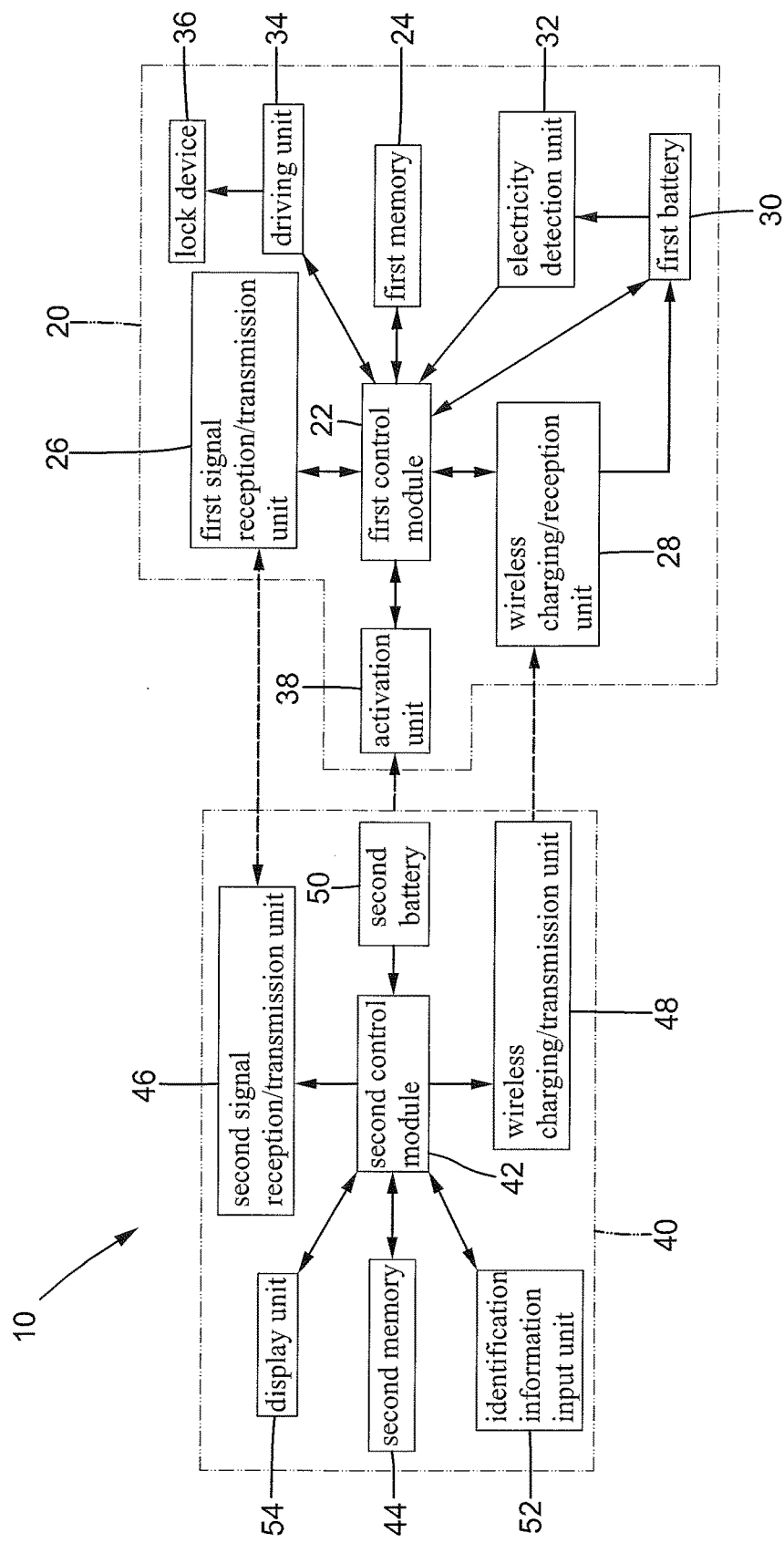
FIG. 1 is a block diagram illustrating an electric lock system for carrying out a method for wirelessly charging and unlocking an electric lock according to the present invention.
Figure 2:
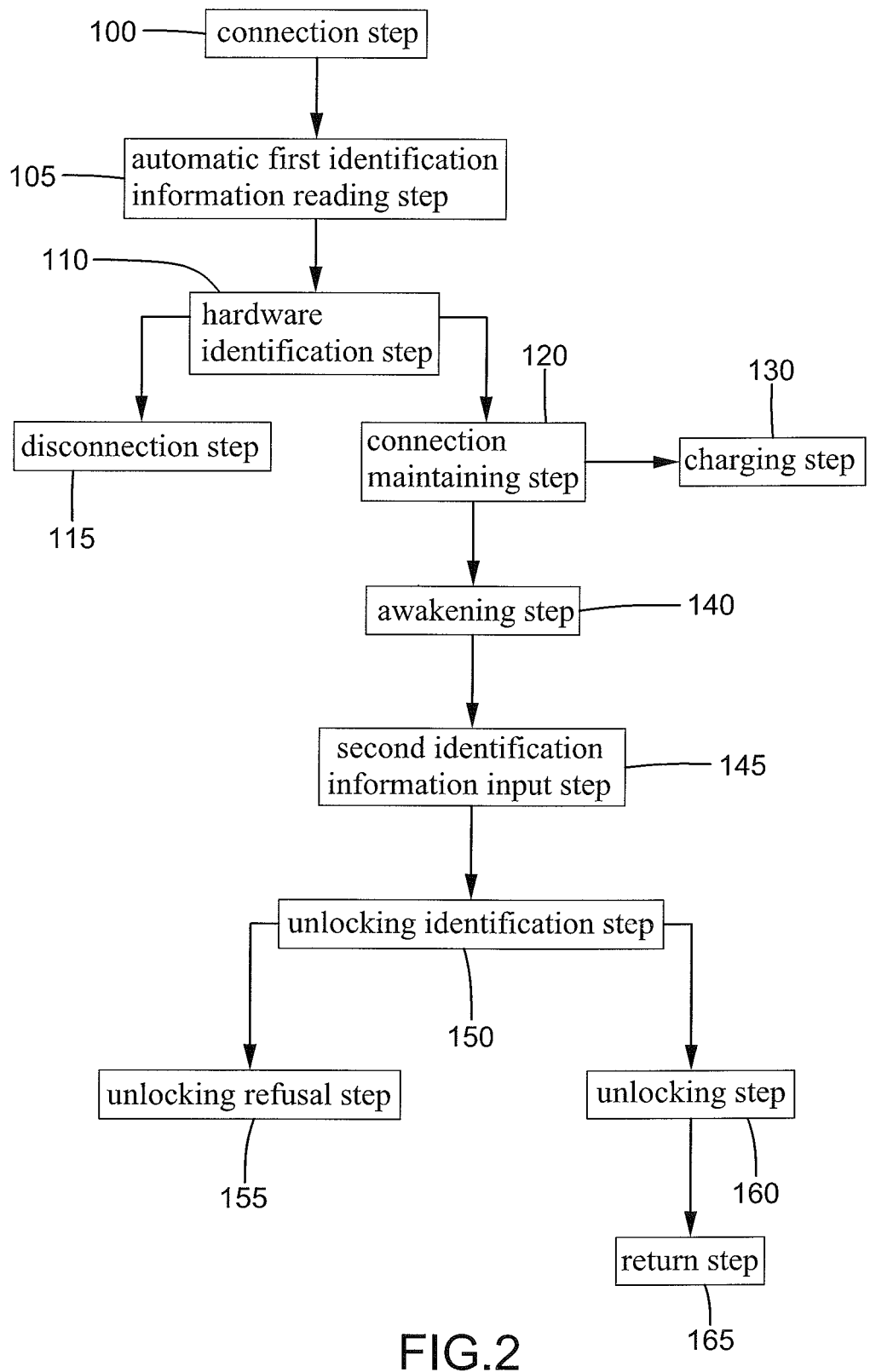
FIG. 2 is a flowchart illustrating an example of the method for wirelessly charging and unlocking an electric lock according to the present invention.

With reference to FIGS. 1 and 2, an electric lock system 10 includes an electric lock 20 and a portable unlocking device 40. The electric lock 20 includes a first control module 22, a first memory 24, a first signal reception/transmission unit 26, a wireless charging/reception unit 28, a first battery 30, an electricity detection unit 32, a driving unit 34, and an activation unit 38. The first memory 24, the first signal reception/transmission unit 26, the wireless charging/reception unit 28, the first battery 30, the electricity detection unit 32, the driving unit 34, and the activation unit 38 are connected to the first control module 22. The electric lock 20 further includes a lock device 36 connected to the driving unit 34. It can be appreciated that more than one portable unlocking device 40 can be used.

The first battery 30 supplies electricity required for operation of the electric lock 20. The electricity detection unit 32 is used to detect the remaining electricity of the first battery 30. The first memory 24 is used to store a first authorized identification information and a second authorized identification information. The first control module 22 controls the driving unit 34 to activate the lock device 36 to thereby lock or unlock the electric lock 20. The driving unit 34 can be a motor or an electromagnetic valve. The lock device 36 can be a latch device configured to lock and unlock the electric lock 20 through the motor or the electromagnetic valve. The first signal reception/transmission unit 26 can use at least one of WI-FI, Bluetooth, and radio frequency identification (RFID).

The portable unlocking device 40 can be a smart phone available in the market. The portable unlocking device 40 includes a second control module 42, a second memory 44, a second signal reception/transmission unit 46, a wireless charging/transmission unit 48, a second battery 50, an identification information input unit 52, and a display unit 54. The second memory 44, the second signal reception/transmission unit 46, the wireless charging/transmission unit 48, the second battery 50, the identification information input unit 52, and the display unit 54 are electrically connected to the second control module 42.

The second battery 50 supplies electricity required for operation of the portable unlocking device 40. The second signal reception/transmission unit 46 can use at least one of WI-FI, Bluetooth, and radio frequency identification (RFID). The display unit 54 can be a liquid crystal screen or a touch control screen. The identification information input unit 52 can be a biological feature pickup device. For example, the identification information input unit 52 can include at least one of a fingerprint pickup device, an iris pickup device, a vein pickup device, an audio pickup device, a touch screen, and a camera. The second memory 44 stores first identification information (which is unique to each portable unlocking device 40) and a lock control program executable by the portable unlocking device 40. The first identification information can be a hardware identification number. In a case that the portable unlocking device 40 is a smart phone, the first identification information can be the international mobile equipment identity (IMEI) of the smart phone. The portable unlocking device 40 can be a smart phone, a tablet computer, or a portable electronic key.

During the matching operation between the electric lock 20 and the portable unlatching device 40, the first identification information stored in the second memory 44 of the portable unlocking device 40 is transmitted to the electric lock 20 and is stored in the first memory 24 as authorized first identification information. In a case that the portable unlocking device 40 is a smart phone, during the matching between the electric lock 20 and the portable unlatching device 40, the IMEI of the smart phone is stored in the first memory 24 of the electric lock 20 and becomes the first authorized identification information. The matching operation between the electric lock 20 and the portable unlatching device 40 can be achieved by any currently available technique. In a non-restrictive example, a button for matching or registration is mounted in the electric lock 20 and can be pressed only after removal of a casing of the electric lock 20 for a subsequent matching operation.

In an example, the lock control program can be executed in the background and is not shown on the display unit 54, which is convenient for rapid connection between the portable unlocking device 40 and the electric lock 20 for providing more convenient and rapider unlocking operations. Specifically, after execution, the lock control program enters a background execution state which is advantageous for the electric lock 20 to awaken the lock control program (to display the icon of the lock control program on the display unit 54) when the distance between the portable unlocking device 40 and the electric lock 20 is within an activation range of the electric lock 20. Thus, the user can proceed with unlocking of the electric lock 20 by execution of the lock control program which also guides the user to input the second identification information.

FIG. 2 shows a flowchart of a first example of the method for wirelessly charging and unlocking an electric lock according to the present invention executed through the electric lock system 10. The method includes a connection step 100 including automatically connecting a portable unlocking device 40 with an electric lock 20 when the distance between the portable unlocking device 40 and the electric lock 20 is smaller than the activation range. Specifically, when the distance between the portable unlocking device 40 and the electric lock 20 is larger than the activation range of the activation unit 38, the first control module 22 identifies that no person is near the electric lock 20 and, thus, controls the first signal reception/transmission unit 26 to hibernate. On the other hand, when the distance between the portable unlocking device 40 and the electric lock 20 is smaller than the activation range (such as 3 meters) of the activation unit 38, the first control module 22 of the electric lock 20 awakens the first signal reception/transmission unit 26 to connect the first signal reception/transmission unit 26 with the second signal reception/transmission unit 46 (under the control by the lock control program). In this state, the portable unlocking device 40 and the electric lock 20 can transmit or receive signals or information to and from each other.

After the portable unlocking device 40 is connected to the electric lock 20, an automatic first identification information reading step 105 is carried out. Specifically, after the portable unlocking device 40 is connected to the electric lock 20, the portable unlocking device 40 automatically transmits the first identification information stored in the second memory 44 to the first signal reception/transmission unit 26 of the electric lock 20 through the second signal reception/transmission unit 46.

Then, a hardware identification step 110 is carried out after the electric lock 20 receives the first identification information of the portable unlocking device 40. In the hardware identification step 110, the electric lock 20 compares the first identification information with the first authorized identification information stored in the electric lock 20. Specifically, the first control module 22 reads the authorized first identification information in the first memory 24 and then compares the authorized first identification information with the first identification information in the portable unlocking device 40 connected to the electric lock 20. It is noted that the authorized first identification information stored in the first memory 24 can include a plurality of data pieces corresponding to a plurality of portable unlocking devices 40.

When the first identification information does not match with the first authorized identification information, a disconnection step 115 is carried out to disconnect the electric lock 20 from the portable unlocking device 40. Specifically, when it is identified that the first identification information does not match with the first authorized identification information, the first control module 22 of the electric lock 20 disconnects the first signal reception/transmission unit 26 from the second signal reception/transmission unit 46 of the portable unlocking device 40, thereby disconnecting the portable unlocking device 40 from the electric lock 20. Furthermore, the first control module 22 controls the first signal reception/transmission unit 26 back to the hibernation state. It is noted that after disconnecting the portable unlocking device 40 from the electric lock 20, if the portable unlocking device 40 is still within the activation range of the activation unit 38, the portable unlocking device 40 will not be connected to the electric lock 20 until the portable unlocking device 40 moves out of the activation range of the activation range 38 and then moves into the activation range of the activation unit 38 again.

On the other hand, when the control module 22 identifies that the first identification information matches with one of the data pieces of the first authorized identification information, a connection maintaining step 120 is carried out to maintain the connection between the electric lock 20 and the portable unlocking device 40.

When the connection between the electric lock 20 and the portable unlocking device 40 is maintained, a charging step 130 is carried out. Specifically, in the charging step 130, the electric lock 20 transmits a charging request signal to the portable unlocking device 40, and the portable unlocking device 40 transmits a charging signal to proceed with charging of the first battery 30 that provides electricity required for operation of the electric lock 20. Specifically, the first control module 22 of the electric lock 20 transmits a charging request signal to the second signal reception/transmission unit 46 of the portable unlocking device 40 through the first signal reception/transmission unit 26. The second control module 42 of the portable unlocking device 40 receives the charging request signal via the second signal reception/transmission unit 46 and then activates the wireless charging/transmission unit 48 to output a charging signal to the wireless charging/reception unit 28 of the electric lock 20, thereby charging the first battery 30 of the electric lock 20.

When the connection between the electric lock 20 and the portable unlocking device 40 is maintained, an awakening step 140 is also executed in addition to the charging step 130. In the awakening step 140, the electric lock 20 outputs an awakening signal to the portable unlocking device 40 to awaken a lock control program in the portable unlocking device 40. Specifically, the first control module 22 of the electric lock 20 outputs an awakening signal to the second signal reception/transmission unit 46 of the portable unlocking device 40 through the first signal reception/transmission unit 26. Then, the second control module 42 of the portable unlocking device 40 receives the awakening signal and displays an operating interface of the lock control program on the screen of the display unit 54.

After the operating interface of the lock control program is shown on the screen of the display unit 54, a second identification information input step 145 is carried out. In the second identification input step 145, after the lock control program has been awakened, the user of the portable unlocking device 40 instantly inputs a second identification information that is sent to the electric lock 20. Specifically, the operating interface of the lock control program permits the user to use the identification information input unit 52 to instantly input the second identification information under the guidance by the lock control program. It is noted that the second identification information is not stored in the second memory 44 of the portable unlocking device 40 in advance. Instead, the second identification information is inputted during the second identification information input step 145. The second identification information can be a biological feature (such as fingerprints, an iris, the sound, or the face of the user), a password, a pattern, or any workable or known information. In an example, the portable unlocking device 40 is a smart phone, and a fingerprint pickup device of the smart phone can be used as the identification information input unit 52 for executing the second identification information input step 145. Alternatively, the touch control screen of the smart phone can be used as the identification information input unit 52. Namely, the display unit 54 and the identification information input unit 52 are the same unit. Thus, execution of the second identification information input step 145 can use the touch control screen to input a password or a pattern.

The second identification information inputted via the identification information input unit 52 of the portable unlocking device 40 will not be stored in the second memory 44. The second identification information is directly sent by the second signal reception/transmission unit 46 to the first signal reception/transmission unit 26 of the electric lock 20.

An unlocking identification step 150 is carried out after the electric lock 20 receives the second identification information from the portable unlocking device 40. In the unlocking identification step 150, the electric lock 20 compares the second identification information with the second authorized identification information stored in the electric lock 20. Namely, after receiving the second identification information from the portable unlocking device 40, the first control module 22 of the electric lock 20 reads the second authorized identification information in the first memory 24 and compares the second authorized identification information with the second identification information. It can be appreciated that the second authorized identification information can include a plurality of data pieces corresponding to a plurality of portable unlocking devices 40.

When the first control module 22 of the electric lock 20 identifies that the second identification information does not match with the second authorized identification information, an unlocking refusal step 155 is carried out to maintain the electric lock 20 in the locked state. Specifically, since the lock device 36 is normally in the latched state, when the first control module 22 executes the unlocking refusal step 155, the first control module 22 does not activate the driving unit 34, and the lock device 36 remains in the latched state. Thus, the electric lock 20 remains in the locked state.

When the first control module 22 of the electric lock 20 identifies that the second identification information matches with one of the data pieces of the second authorized identification information, an unlocking step 160 is carried out to unlock the electric lock 20. Specifically, when the first control module 22 executes the unlocking step 160, the first control module 22 activates the driving unit 34 to move the latch of the latch device 36 to the unlatching position. Thus, the electric lock 20 is set to the unlocked state.

After the electric lock 20 is set to the unlocked state, if the holder of the portable unlocking device 40 moves to a position outside of the activation range of the activation unit 38, a return step 165 is carried out to lock the electric lock 20 again. Namely, to assure the anti-burglar effect of the electric lock 20, after the electric lock 20 has been unlocked through the proper unlocking operation through the portable unlocking device 40, if the holder of the portable unlocking device 40 moves away from the electric lock 20 (such as entering a room), the portable unlocking device 40 also moves outside of the activation range of the activation unit 38 (the distance between the portable unlocking device 40 and the electronic device 20 is larger than the activation range). Thus, when the activation unit 38 of the electric lock 20 detects that no person is inside the activation range, the first control module 22 of the electric lock 20 activates the driving unit 34 to move the latch of the lock device 36 to the latching position, returning the electric lock 20 to the locked state.

The advantage of the method of the first example according to the present invention is that every time the portable unlocking device 40 unlocks the electric lock 20, the portable unlocking device 40 charges the first battery 30 of the electric lock 20. Thus, the first battery 30 can supply the electric lock 20 with sufficient electricity to operate for a longer period of time, reducing the frequency of malfunctioning of the electric lock 20 resulting from lack of electricity and the frequency of replacing the first battery 30.

Figure 3:
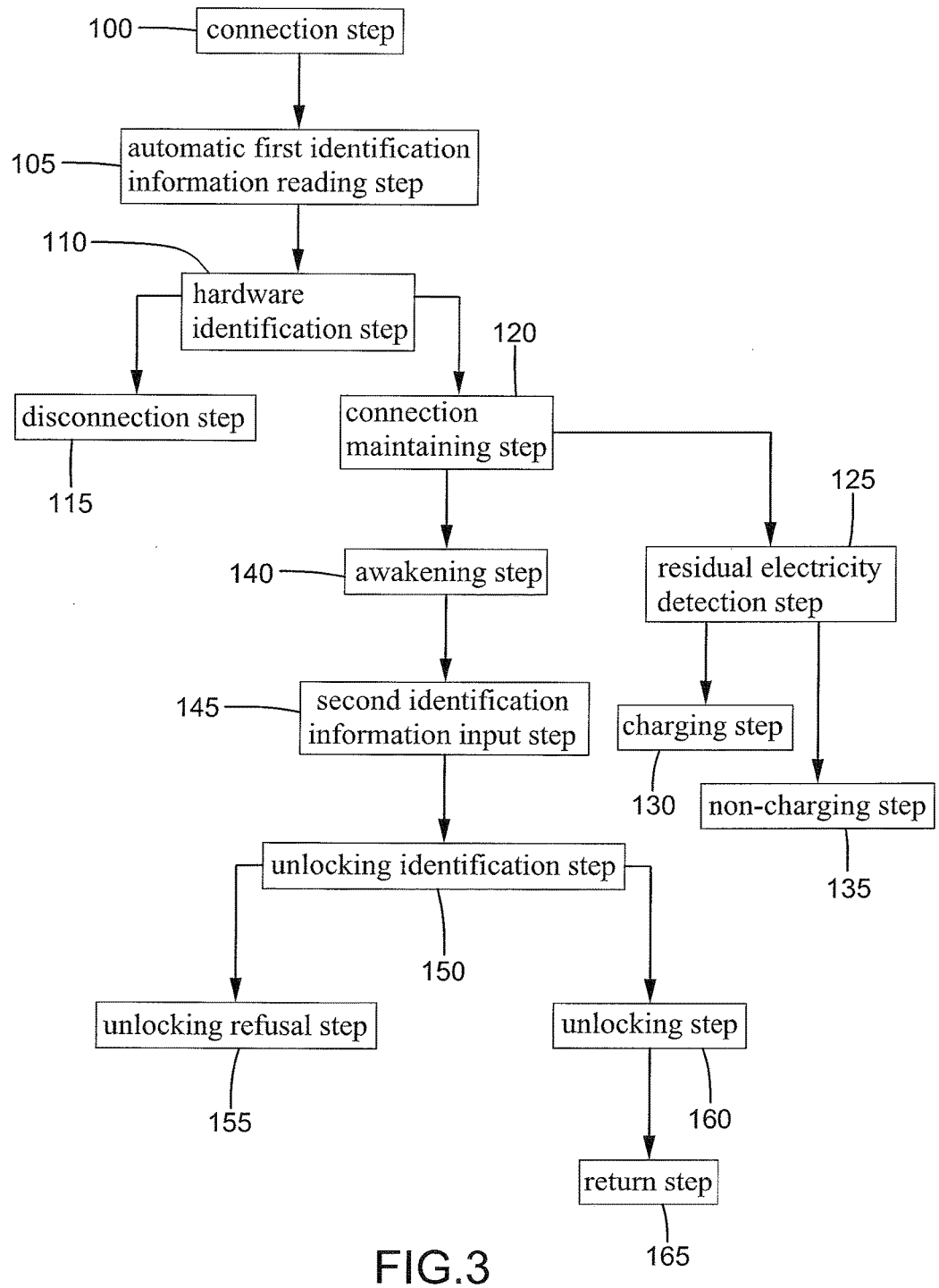
FIG. 3 is a flowchart illustrating another example of the method for wirelessly charging and unlocking an electric lock according to the present invention.

FIG. 3 shows a flowchart illustrating a second example of the method for wirelessly charging and unlocking an electric lock according to the present invention. In the second example, the electricity detection unit 32 of the electric lock system 10 is used to detect the residual electricity of the first battery 30 to identify whether wireless charging of the first battery 30 is necessary.

Specifically, when the connection between the portable unlocking device 40 and the electric lock 20 is maintained, a residual electricity detection step 125 is carried out to detect the residual electricity of the first battery 30 that provides electricity required for operation of the electric lock 20. More specifically, the electricity detection unit 32 of the electric lock 20 detects the voltage value or the current value of the first battery 30 to identify whether the residual electricity of the first battery 30 is at a high residual level or a low residual level. The low residual level does not mean the residual electricity of the first battery 30 is insufficient for supporting operation of the electric lock 20 but means that the residual electricity of the first battery 30 can support normal operation of the electric lock 20 for a period of time (such as one month) without charging.

If the electricity detection unit 32 of the electric lock 20 detects that the first battery 30 is at the high residual level (the residual electricity of the first battery 30 is larger than a predetermined value), a non-charging step 135 is carried out. Namely, the electric lock 20 does not output a charging request signal to the portable unlocking device 40, and the portable unlocking device 40 does not transmit the charging signal to the electronic device 20. Specifically, when the residual electricity of the first battery 30 is at the high level, the first control module 22 will not send the charging request signal to the portable unlocking device 40 via the first signal reception/transmission unit 26. In this case, the second control module 42 of the portable unlocking device 40 will not activate the wireless charging/transmission unit 48 to output the charging signal. Thus, the portable unlocking device 40 will not proceed with wireless charging for the first battery 30 of the electric lock 20.

On the other hand, if the electricity detection unit 32 of the electric lock 20 detects that the first battery 30 is at the low residual level (the residual electricity of the first battery 30 is smaller than the predetermined value), a charging step 130 is carried out. Specifically, the first control module 22 sends the charging request signal to the portable unlocking device 40 via the first signal reception/transmission unit 26 when the residual electricity is smaller than the predetermined value. The second control module 42 of the portable unlocking device 40 activates the wireless charging/transmission unit 48 to output the charging signal to the wireless charging/reception unit 28 to proceed with wireless charging for the first battery 30 of the electric lock 20.

When the connection between the electric lock 20 and the portable unlocking device 40 is maintained, an awakening step 140 is also executed in addition to the charging step 130 and the non-charging step 135. In the awakening step 140, the electric lock 20 outputs an awakening signal to the portable unlocking device 40 to awaken a lock control program in the portable unlocking device 40. Specifically, the first control module 22 of the electric lock 20 outputs an awakening signal to the second signal reception/transmission unit 46 of the portable unlocking device 40 through the first signal reception/transmission unit 26. Then, the second control module 42 of the portable unlocking device 40 receives the awakening signal and displays an operating interface of the lock control program on the screen of the display unit 54.

Other steps of the second example are substantially the same as those of the first example. In comparison with the first example, the second example includes an advantage of slow power consumption of the second battery 50 of the portable unlocking device 40. Specifically, the electric lock 20 sends the charging request signal to the portable unlocking device 40 only when the residual electricity of the first battery 30 is at the low level, such that the portable unlocking device 40 does not charge the first battery 30 every time. The power consumption of the second battery 50 is reduced while permitting normal operation of the electric lock 20. Namely, the second example maintains normal operation of the electric lock 20 and reduces the power consumption of the portable unlocking device 40.

Each example of the method for wirelessly charging and unlocking an electric lock according to the present invention provides unlocking of the electric lock 20 through convenient and rapid operations. Specifically, the portable unlocking device 40 must be connected to the electric lock 20 and must operate the electric lock 20 for the unlocking operation. A feature of the method according to the present invention is that the lock control program is executed in the background instead of being displayed on the screen of the display unit 54. When the portable unlocking device 40 is within the activation range of the activation unit 38 of the electric lock 20, the electric lock 20 automatically reads the first identification of the portable unlocking device 40 and identifies whether the first identification has been authorized (deciding whether the portable unlock device 40 is a registered unlocking device). If yes, the electric lock 20 automatically transmit an awakening signal to awake the lock control program in the portable unlocking device 40 and to display the corresponding icon on the screen of the display unit 54, such that the user can use the identification information input unit 52 of the portable unlocking device 40 to input the second identification information to the electric lock 20 for the unlocking operation. During these steps, only input of the second identification information requires manual operation by the user. The rest of the steps are automatically carried out by the electric lock 20 and the portable unlocking device 40. Thus, rapid and easy operation of the electric lock 20 is achieved.

Furthermore, even if the portable unlocking device 40 is lost, decoding of the electric lock 20 is not easy, providing high safety. Specifically, since unlocking of the electric lock 20 requires instant input of the second information identification through the portable unlocking device 40, it is highly unlikely that a person picking up the portable unlocking device 40 can input authorized identification information, because the second identification information is not stored in the first memory 24 of the electric lock 20. Thus, the person picking up the portable unlocking device 40 would fail in the attempt to unlock the electric lock 20, because the second identification information inputted by this person would not match the authorized second identification information. Consequently, each example of the method for wirelessly charging and unlocking an electric lock according to the present invention provides high safety in use.

Now that the basic teachings of the present invention have been explained, many extensions and variations will be obvious to one having ordinary skill in the art. For example, the first and second examples of the method for wirelessly charging and unlocking an electric lock according to the present invention do not have to include the charging step 130. In this case, the electric lock 20 can be conveniently and rapidly unlocked by the portable unlocking device 40. Furthermore, the second example of the method for wirelessly charging and unlocking an electric lock according to the present invention does not have to include the residual electricity detection step 125, the charging step 130, and the non-charging step 135. In this case, the electric lock 20 can be conveniently and rapidly unlocked by the portable unlocking device 40.

Thus since the illustrative embodiments disclosed herein may be embodied in other specific forms without departing from the spirit or general characteristics thereof, some of which forms have been indicated, the embodiments described herein are to be considered in all respects illustrative and not restrictive. The scope is to be indicated by the appended claims, rather than by the foregoing description, and all changes which come within the meaning and range of equivalency of the claims are intended to be embraced therein.

The invention claimed is:

1. A method comprising:
   automatically connecting a portable unlocking device with an electric lock when a distance between the portable unlocking device and the electric lock is smaller than an activation range;
   automatically reading, by the electric lock, a first identification information stored in the portable unlocking device connected to the electric lock;
   comparing, by the electric lock, the first identification information with a first authorized identification information stored in the electric lock;
   disconnecting the electric lock from the portable unlocking device when the first identification information does not match with the first authorized identification information;
   maintaining the connection between the electric lock and the portable unlocking device when the first identification information matches with the first authorized identification information;
   transmitting a charging request signal, by the electric lock to the portable unlocking device when the connection between the electric lock and the portable unlocking device is maintained, and transmitting, by the portable unlocking device, a charging signal to proceed with charging of a first battery that provides electricity required for operation of the electric lock;
   outputting an awakening signal, by the electric lock, to the portable unlocking device to awaken a lock control program in the portable unlocking device when the connection between the electric lock and the portable unlocking device is maintained;
   using the portable unlocking device to instantly input a second identification information after the lock control program has been awakened, and sending the second identification information to the electric lock;
   comparing the second identification information, by the electric lock, with second authorized identification information stored in the electric lock;
   maintaining the electric lock in a locked state when the second identification information does not match with the second authorized identification information; and
   unlocking the electric lock when the second identification information matches with the second authorized identification information.

2. The method as claimed in claim 1, further comprising:
   locking the unlocked electric lock when the distance between the portable unlocking device and the electronic device is larger than the activation range.

3. A method comprising:
   automatically connecting a portable unlocking device with an electric lock when a distance between the portable unlocking device and the electric lock is smaller than an activation range;
   automatically reading, by the electric lock, a first identification information stored in the portable unlocking device connected to the electric lock;
   comparing, by the electric lock, the first identification information with a first authorized identification information stored in the electric lock;
   disconnecting the electric lock from the portable unlocking device when the first identification information does not match with the first authorized identification information;
   maintaining the connection between the electric lock and the portable unlocking device when the first identification information matches with the first authorized identification information;
   detecting, by the electric lock, a residual electricity of a first battery that provides electricity required for operation of the electric lock;
   transmitting a charging request signal, by the electric lock, to the portable unlocking device when the residual electricity is smaller than a predetermined value, and transmitting, by the portable unlocking device, a charging signal to proceed with charging of the first battery;
   not outputting the charging request signal to the portable unlocking device when the residual electricity is greater than the predetermined value, and not transmitting the charging signal to the electronic device;
   outputting an awakening signal, by the electric lock, to the portable unlocking device to awaken a lock control program in the portable unlocking device when the connection between the electric lock and the portable unlocking device is maintained;
   using the portable unlocking device to instantly input a second identification information after the lock control program has been awakened, and sending the second identification information to the electric lock;
   comparing the second identification information, by the electric lock, with second authorized identification information stored in the electric lock;
   maintaining the electric lock in a locked state when the second identification information does not match with the second authorized identification information; and
   unlocking the electric lock when the second identification information matches with the second authorized identification information.

4. The method as claimed in claim 3, further comprising:
   locking the unlocked electric lock when the distance between the portable unlocking device and the electronic device is larger than the activation range.

5. A method comprising:
   automatically connecting a smart phone with an electric lock when a distance between the smart phone and the electric lock is smaller than an activation range;
   automatically reading, by the electric lock, a first identification information stored in the smart phone connected to the electric lock;
   comparing, by the electric lock, the first identification information with a first authorized identification information stored in the electric lock;
   disconnecting the electric lock from the smart phone when the first identification information does not match with the first authorized identification information;

maintaining the connection between the electric lock and the smart phone when the first identification information matches with the first authorized identification information;

outputting an awakening signal, by the electric lock, to the smart phone to awaken a lock control program in the smart phone when the connection between the electric lock and the smart phone is maintained;

using the portable unlocking device to instantly input a second identification information after the lock control program has been awakened, and sending the second identification information to the electric lock;

comparing the second identification information, by the electric lock, with second authorized identification information stored in the electric lock;

maintaining the electric lock in a locked state when the second identification information does not match with the second authorized identification information; and unlocking the electric lock when the second identification information matches with the second authorized identification information.

\* \* \* \* \*